(12) United States Patent
Wurtenberger et al.

(10) Patent No.: US 10,117,248 B1
(45) Date of Patent: Oct. 30, 2018

(54) DYNAMIC FREQUENCY ALLOCATION TO MITIGATE TROPOSPHERIC DUCTING

(71) Applicant: Sprint Communications Company L.P., Overland Park, KS (US)

(72) Inventors: Andrew Mark Wurtenberger, Olathe, KS (US); Sreekar Marupaduga, Overland Park, KS (US); Rajveen Narendran, Olathe, KS (US); Ryan Patrick Dreiling, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 154 days.

(21) Appl. No.: 15/196,411

(22) Filed: Jun. 29, 2016

(51) Int. Cl.
*H04W 28/02* (2009.01)
*H04W 72/04* (2009.01)

(52) U.S. Cl.
CPC ... *H04W 72/0453* (2013.01); *H04W 28/0236* (2013.01); *H04W 72/042* (2013.01); *H04W 72/0413* (2013.01)

(58) Field of Classification Search
CPC ......... H04W 72/0453; H04W 72/0413; H04W 28/0236; H04W 72/042
See application file for complete search history.

(56) References Cited

U.S. PATENT DOCUMENTS

| | | | | |
|---|---|---|---|---|
| 4,125,893 A | * | 11/1978 | Hitney | G01S 7/4004 702/3 |
| 6,011,820 A | * | 1/2000 | Rosengren | H04H 20/18 370/509 |
| 6,094,584 A | * | 7/2000 | Khanna | H04W 16/10 455/452.2 |
| 6,304,760 B1 | * | 10/2001 | Thomson | H04B 17/309 455/503 |
| 2012/0314592 A1 | * | 12/2012 | Behravan | H04B 7/2656 370/252 |
| 2015/0381221 A1 | * | 12/2015 | Cyzs | H04B 1/7097 375/346 |
| 2016/0274026 A1 | * | 9/2016 | Solheim | G01W 1/00 |

* cited by examiner

*Primary Examiner* — Walter J Divito (57) ABSTRACT

Systems, methods, and computer-readable media for mitigating interference caused by tropospheric ducting are provided. Tropospheric ducting causes interference by propagating signals transmitted from one base station, which may be received by a second base station in a neighboring market operating on the same frequencies as the first base station. Atmospheric conditions are monitored to determine an interference probability, or a probability that tropospheric ducting is occurring, while an interference level is also determined. Based on the interference level and interference probability, it is determined whether to utilize a ducting mitigation mode in which the frequencies operating by antennas at the first base station are different than frequencies operating by antennas at the second base station. Upon determining whether to utilize the ducting mitigation mode, adjustments may be made to the antennas in accordance with the ducting mitigation mode.

20 Claims, 6 Drawing Sheets

DYNAMIC FREQUENCY ALLOCATION TO MITIGATE TROPOSPHERIC DUCTING

BRIEF SUMMARY

A high-level overview of various aspects of the technology described herein is provided here to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, dynamically allocating frequency to mitigate the effects of tropospheric ducting on a radio signal. Tropospheric ducting is caused by certain atmospheric conditions and leads to increased propagation of signals. This signal propagation causes interference when signals transmitted from a first base station are received by a second base station in a neighboring market, leading to downgrading of radio communication links. The present disclosure seeks to reduce this effect by dynamically allocating frequencies among base stations affected by tropospheric ducting. Specifically, channels used by one or more antennas on a first base station may be adjusted so that the frequencies used for these antennas are different than the frequencies used for the second base station. In this way, propagated signals from the first base station will not be received by the second base station. Antennas at the second base station may also be adjusted to allocate different frequencies. Once the conditions for tropospheric ducting cease or once the adjustments are no longer desirable, the one or more antennas may be readjusted so that they are operating at their original frequencies.

BRIEF DESCRIPTION OF THE DRAWINGS

Illustrative embodiments of the present invention are described in detail below with reference to the attached drawing figures, and wherein.

DETAILED DESCRIPTION

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Figure 1:
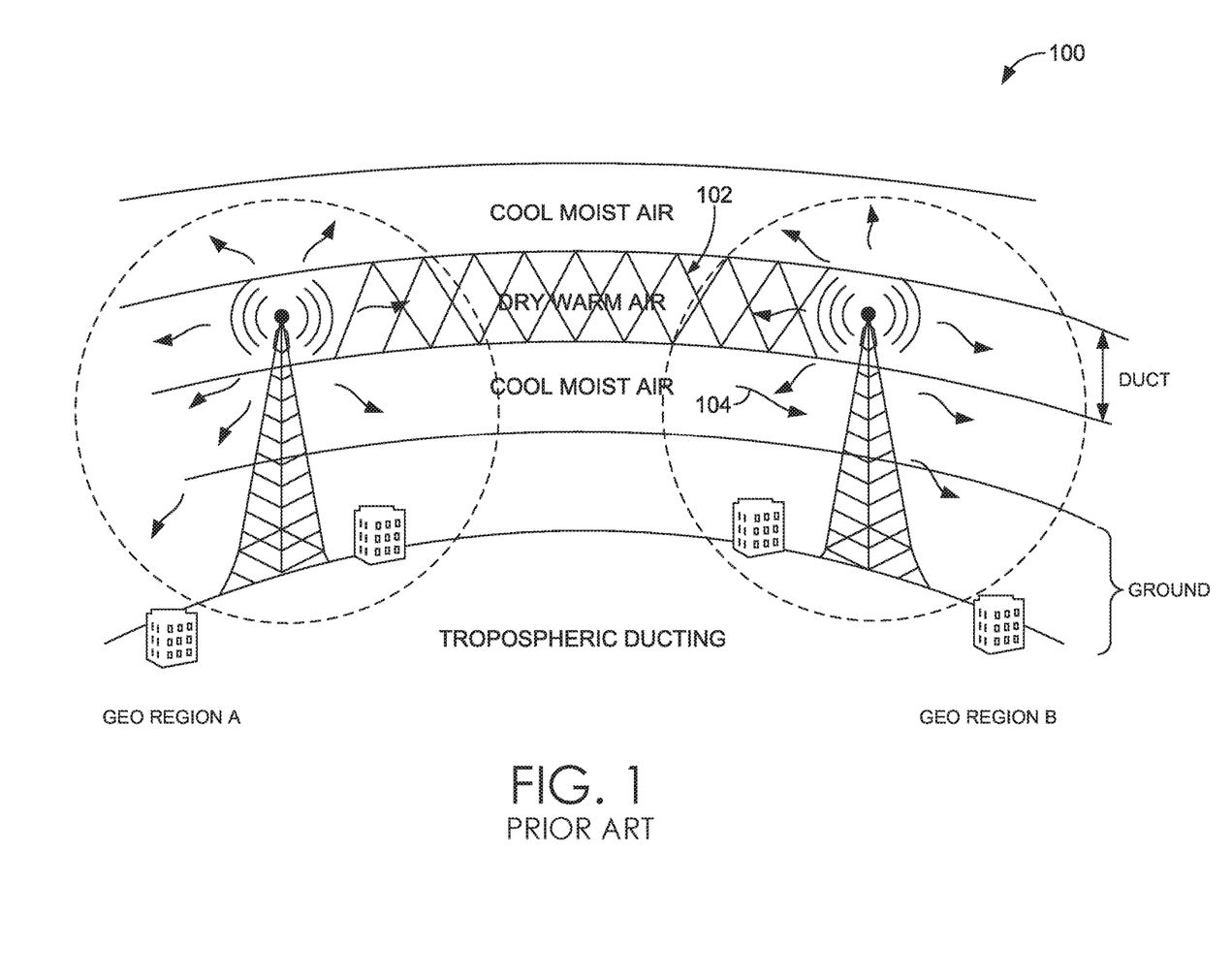
FIG. 1 depicts tropospheric ducting occurring in an environment.

Embodiments of the present invention may be embodied as, among other things, a method, a system, or a set of instructions embodied on one or more computer-readable media. As mentioned, embodiments of the present invention are directed to dynamically allocating frequency to mitigate the effects of tropospheric ducting on a radio signal. Tropospheric ducting, as used herein, refers to the ability of radio waves to propagate farther than anticipated due to atmospheric conditions in the Earth's troposphere, which is the lowest region of the atmosphere. Tropospheric ducting, which is also referred to as tropospheric propagation, is caused when particular atmospheric conditions create a higher refractive index. FIG. 1 depicts an environment 100 in which tropospheric ducting is occurring. As shown in FIG. 1, such atmospheric conditions include a layer of warm, dry air positioned between two layers of cool moist air, which creates defined air masses of different densities. As a radio signal passes between the layers, it is refracted due to the change in densities and may become trapped between these layers, which is shown in FIG. 1 as reference numeral 102. Rather than traveling in a straight line into the atmosphere, the propagated radio signal is able to travel in a curved line following the curvature of the Earth. This tropospheric ducting causes the radio signal to travel greater distances than line-of-sight calculations would predict. As shown in FIG. 1, a radio signal originating from geographical region A may travel to geographical region B, such as the signal represented by reference numeral 104, and vice versa.

Tropospheric ducting causes interference in cellular communications networks. The effect is particularly acute in networks operating with time division duplexing (TDD). Using TDD, a single frequency channel may be used for both transmitting and receiving. In other words, uplink (UL) and downlink (DL) signals use the same frequency but at different times. Due to the time delay, a radio signal transmitted by a base station in one market, such as in geographical region A, may be received by a second base station in a second market, such as geographical region B, thereby causing interference and increased noise resulting in dropped and/or failed calls.

The present disclosure seeks to reduce this effect by dynamically allocating frequencies among base stations affected by the tropospheric ducting. Specifically, one or more antennas on a first base station may be adjusted so that the frequencies used for the first base station are different than the frequencies used for the second base station. In this way, propagated signals from the first base station cannot be received by the second base station. Once the conditions for tropospheric ducting cease or once the adjustments are no longer desirable, the one or more antennas may be readjusted so that they are operating at their original frequencies.

Accordingly, in one aspect, the present disclosure includes one or more non-transitory computer-readable storage media having computer-executable instructions embodied thereon that, when executed, perform a method for mitigating interference caused by tropospheric ducting. The method includes, at a server having one or more processors, receiving one or more indicators of atmospheric conditions in at least a region located between a first base station and a second base station. The first base station may have one or more first base station antennas while the second base station may have one or more second base station antennas.

An interference probability may be determined based on the one or more indicators of atmospheric conditions. An interference level for one or more signals transmitted from the first base station may also be determined. The method also includes determining whether to utilize a ducting mitigation mode based on at least the interference probability and the interference level. The ducting mitigation mode may comprise a state in which at least a portion of the one or more first base station antennas are operating at one or more first base station frequencies and at least a portion of the one or more second base station antennas are operating at one or more second base station frequencies, wherein the one or more first base station frequencies and the one or more second base station frequencies are different. Upon determining to utilize the ducting mitigation mode, the method further comprises instructing the first base station to make one or more adjustments to the portion of the one or more first base station antennas in accordance with the ducting mitigation mode.

In another aspect, the present disclosure includes one or more non-transitory computer-readable storage media having computer-executable instructions embodied thereon that, when executed, perform a method for mitigating interference caused by tropospheric ducting. The method includes, at a first base station, receiving one or more indicators of atmospheric conditions in at least a region located between the first base station and a second base station, which is located at a predetermined distance from the first base station. The first base station may have one or more first base station antennas, and the second base station may have one or more second base station antennas. The method may also include determining an interference probability based on the one or more indicators of atmospheric conditions. An interference level for one or more signals transmitted from the first base station may also be determined. Based on at least the interference probability and the interference level, it is determined whether to utilize a ducting mitigation mode, which may comprise a state where at least a portion of the one or more first base station antennas are operating at one or more first base station frequencies and at least a portion of the one or more second base station antennas are operating at one or more second base station frequencies, wherein the one or more first base station frequencies and the one or more second base station frequencies are different. Upon determining to utilize the ducting mitigation mode, the method further includes disabling one or more channels that are used by the portion of the one or more first base station antennas that are operating at a frequency that is the same as one of the second base station frequencies.

In yet another aspect, a system for mitigating interference caused by tropospheric ducting is provided. The system includes a first base station with one or more first base station antennas and a second base station with one or more second base station antennas. The second base station may be located at a predetermined distance from the first base station. The system also comprises a server having one or more processors and one or more non-transitory computer storage media that is configured to receive one or more indicators of atmospheric conditions; determine an interference probability based on the one or more indicators of atmospheric conditions; determine an interference level for one or more signals transmitted from the first base station; and, based on the interference probability and the interference level, determine whether to utilize a ducting mitigation mode. As previously mentioned, the ducting mitigation mode may comprise a state where at least a portion of the one or more first base station antennas are operating at one or more first base station frequencies and at least a portion of the one or more second base station antennas are operating at one or more second base station frequencies, wherein the one or more first base station frequencies and the one or more second base station frequencies are different. The computer-readable media may also be configured to, upon determining to utilize the ducting mitigation mode, instruct the first base station to perform one or more adjustments to the portion of the one or more first base station antennas in accordance with the ducting mitigation mode. The computer-readable media may also be configured to instruct the first base station to perform one or more readjustments to the portion of the one or more first base station antennas, wherein the one or more readjustments undo the one or more adjustments performed according to the ducting mitigation mode.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed and are in no way meant to limit the scope of the present invention. The following is a list of these acronyms:

3G Third Generation Mobile Telecommunications
4G Fourth Generation Mobile Telecommunications
BF Beam Forming
CD-ROM Compact Disk Read Only Memory
CDMA Code Division Multiple Access
GPRS General Packet Radio Service
GSM Global System for Mobile communications: originally from Groupe Spécial Mobile
DVD Digital Versatile Discs
EEPROM Electrically Erasable Programmable Read Only Memory
eNodeB Evolved Node B
LTE Long Term Evolution
MIC Microphone
PA Power Amplifier
PC Personal Computer
PDA Personal Digital Assistant
RAM Random Access Memory
ROM Read Only Memory
TDMA Time Division Multiple Access
UE User Equipment
UMTS Universal Mobile Telecommunications System
VOIP Voice Over Internet Protocol
VoLTE Voice Over LTE
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 2:
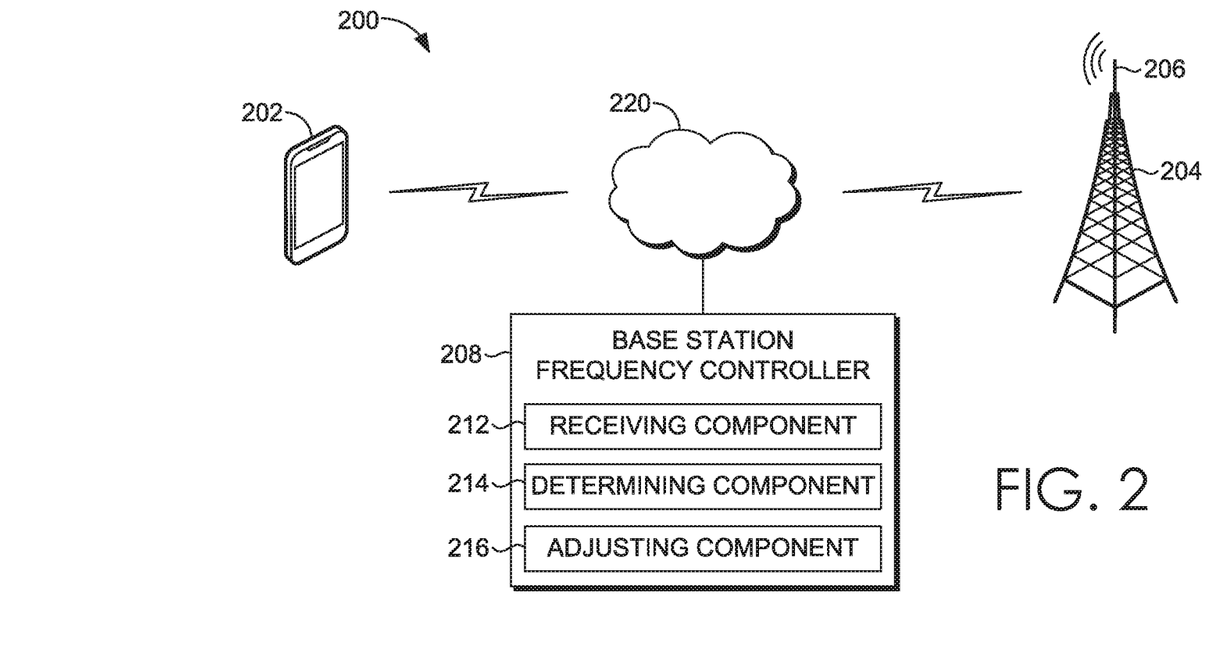
FIG. 2 depicts a wireless communication network, according to an embodiment of the present disclosure.

Turning to FIG. 2, a network environment suitable for use in implementing embodiments of the present disclosure is provided. Such a network environment is illustrated and designated generally as network environment 200. Network environment 200 is but one example of a suitable network environment and is not intended to suggest any limitation as to the scope of use or functionality of the disclosure. Neither should the network environment 200 be interpreted as having any dependency or requirement relating to any one or combination of components illustrated.

As previously mentioned, embodiments of the present invention are directed to mitigating the effects of tropospheric ducting by dynamically allocating frequencies among one or more base stations. Base stations may be used to facilitate wireless communication between a communications device, such as communications device 600 described with respect to FIG. 6, and a network. As shown in FIG. 2, a communications device may be a user device 202. In the network environment 200, user device 202 may communicate with other devices, such as mobile devices, servers, etc. The user device 202 may take on a variety of forms, such as a personal computer, a laptop computer, a tablet, a netbook, a mobile phone, a Smart phone, a personal digital assistant, or any other device capable of communicating with outer devices. For example, the user device 202 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, user device 202 comprises a wireless or mobile device with which a wireless telecommunication network(s) can be utilized for communication (e.g., voice and/or data communication). In this regard, the user device 202 can be any mobile computing device that communicates by way of, for example, a 3G or 4G network.

The user device 202 may utilize network 220 to communicate with other computing devices (e.g., mobile device(s), a server(s), a personal computer(s), etc.). In embodiments, network 220 is a telecommunications network, or a portion thereof. A telecommunications network might include an array of devices or components, some of which are not shown so as to not obscure more relevant aspects of the invention. Components such as terminals, links, and nodes (as well as other components) can provide connectivity in some embodiments. Network 220 can include multiple networks, as well as being a network of networks, but is shown in more simple form so as to not obscure other aspects of the present disclosure. Network 220 can be part of a telecommunications network that connects subscribers to their immediate service provider. In embodiments, network 220 is associated with a telecommunications provider that provides services to user devices, such as user device 202. For example, network 220 may provide voice services to user devices or corresponding users that are registered or subscribed to utilize the services (e.g., network 220) provided by a telecommunications provider. Network 220 can be any communication network providing voice and/or data service(s), such as, for example, a 1× circuit voice, a 3G network (e.g., CDMA, CDMA2000, WCDMA, GSM, UMTS), a 4G network (WiMAX, LTE, HSDPA), or the like.

The network environment 200 may include a database (not shown). The database may be similar to the memory component 612 in FIG. 6 and can be any type of medium that is capable of storing information. The database can be any collection of records. In one embodiment, the database includes a set of embodied computer-executable instructions that, when executed, facilitate various aspects disclosed herein. These embodied instructions will variously be referred to as "instructions" or an "application" for short.

As previously mentioned, the user device 202 may communicate with other devices by using a base station, such as base station 204. In embodiments, base station 204 is a wireless communications station that is installed at a fixed location, such as near the base of a radio tower as is shown in FIG. 2. In other embodiments, base station 204 is a mobile base station. The base station 204 may be an eNode B in an LTE telecommunications network and is used to communicate as part of the wireless communications network. In this way, the base station can facilitate wireless communication between user device 202 and network 220.

The base station 204 may include a radio (not shown) that generally communicates with one or more antennas 206 associated with the base station 204. In this regard, the radio is used to transmit signals or data to an antenna 206 associated with the base station 204 and receive signals or data from the antenna 206. Communications between the radio and the antenna 206 can occur using any number of physical paths. A physical path, as used herein, refers to a path used for transmitting signals or data. As such, a physical path may be referred to as a radio frequency (RF) path, a coaxial cable path, cable path, or the like.

The antenna 206 is used for telecommunications. Generally, the antenna 206 may be an electrical device that converts electric power into radio waves and converts radio waves into electric power. Additionally, a power amplifier (PA) element including one or more power amplifiers may be located within the radio, or the antenna 206 may be equipped with a radio/PA combined element. Power amplifiers are used generally to adjust a power of a signal.

Continuing, the network environment 200 may further include a base station frequency controller 208. The base station frequency controller 208 may be configured to, among other things, control frequencies used by one or more base stations in accordance with the present disclosure. The base station frequency controller 208 may comprise a server having one or more processors. Though the base station frequency controller 208 is illustrated separately in FIG. 2, it may be a component of base station 204. In other embodiments, the base station frequency controller 208 may be remotely located.

As mentioned, the base station frequency controller 208 may control the frequencies used by one or more antennas associated with one or more base stations, such as base station 204. The base station frequency controller 208 may include, among other things, a receiving component 212, a determining component 214, and an adjusting component 216. The receiving component 212 may receive information associated with a radio signal, such as a downlink signal or uplink signal. The information may, for example, relate to an interference level of a signal, which, as used herein, refers to the amount of disruption to a signal due to another signal. An interference level may be in the form of uplink noise rise, call failure rate, and/or call drop rate. Uplink noise rise, as used herein, refers generally to an increase in the amount of uplink signal disruption. A call failure rate, as used herein, refers to a percentage of attempted telephone calls within a network that fail to go through, while the call drop rate refers to a percentage of telephone calls in the network that were ended before either party hung up. In addition to information relating to the interference level, the receiving component 212 may receive information not relating to a particular signal. For instance, the receiving component 212 may receive information about current or future atmospheric or meteorological conditions regions of coverage associated with the base station.

The base station frequency controller 208 may further include a determining component 214 configured to, among other things, determine whether to utilize a ducting mitigation mode to mitigate the effects of tropospheric ducting. The determining component 214 may make this determination based on information received by the receiving component 212, such as atmospheric conditions and an interference level. The adjusting component 216 of the base station frequency controller 208 may then make a number of adjustments in accordance with the ducting mitigation mode. For example, adjusting component 216 may turn off one or more channels for base station 204 that are operating at a frequency used by another base station. In other embodiments, adjusting component 216 may adjust the frequency used by a channel to a new frequency that is not being used by another base station. These adjustments, as well as the functions of the other components of the base station frequency controller 208, are discussed further with respect to FIG. 4.

Figure 3:
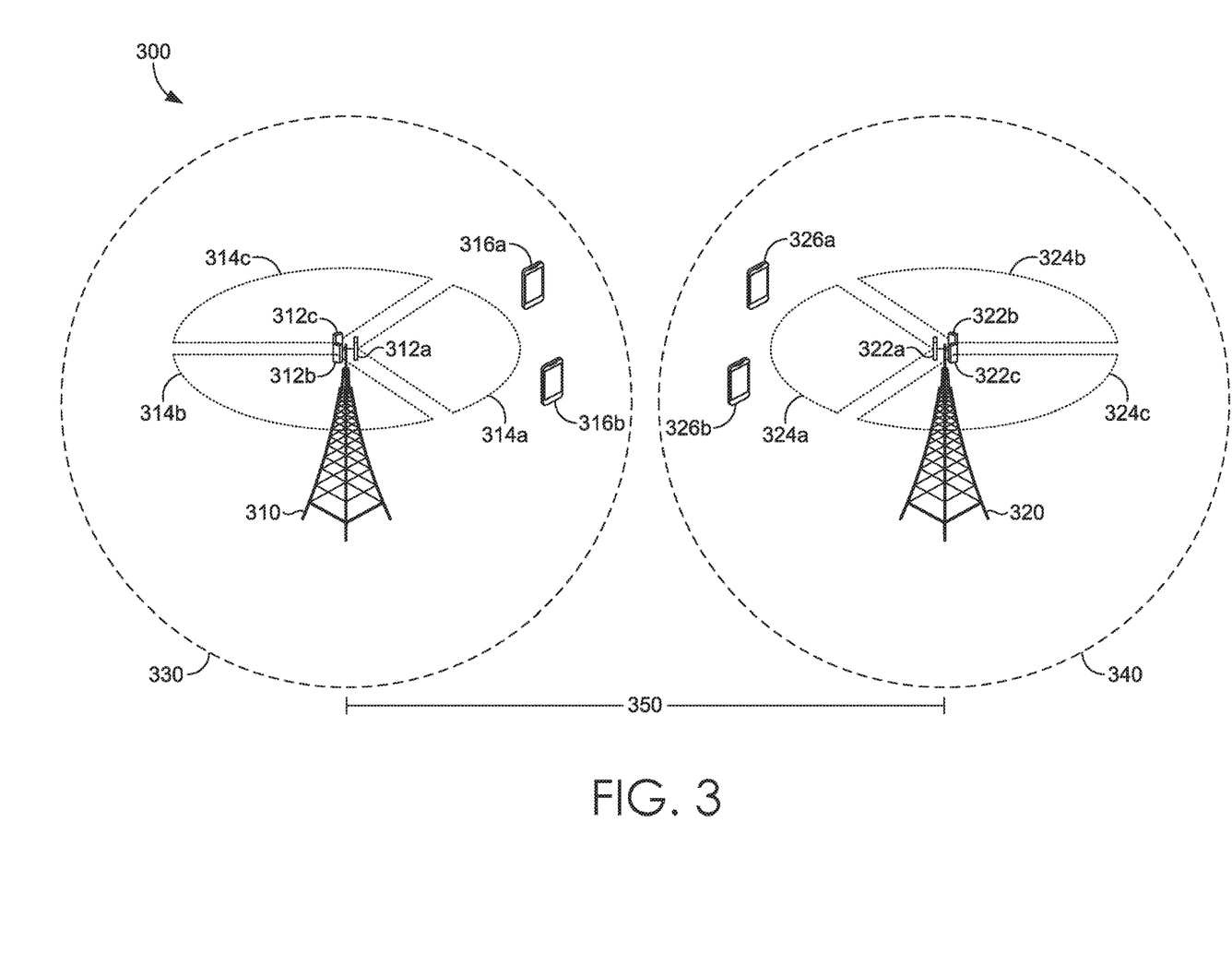
FIG. 3 depicts an operating environment, according to an embodiment of the present invention.

The base station frequency controller 208 may be used to implement aspects of the disclosure relating to dynamically allocating frequencies to mitigate the interference caused by tropospheric ducting, which is further illustrated in the operating environment 300 provided in FIG. 3. As discussed above, base stations may be used to facilitate communications between a user device and a network. As shown in FIG. 3, there may be one or more base stations within a geographical region to service one or more user devices within that region. For example, as provided in FIG. 3, a first base station 310 may operate to serve one or more user devices 316a and 316b within a first market 330 while a second base station 320 may operate to serve one or more user devices 326a and 326b in a second market 340. The first base station 310 and the second base station 320 may include the same attributes as discussed with respect to base station 204 in FIG. 2. The first market 330 and the second market 340 may be geographic regions served by the first base station 310 and second base station 320, respectively.

Each of the first base station 310 and the second base station 320 may include one or more antennas. For example, in the operating environment 300 depicted in FIG. 3, the first base station 310 has three first base station antennas 312a 312b, and 312c (collectively, "312"), and the second base station 320 may have three second base station antennas 322a, 322b, 322c (collectively, "322"). First base station antennas 312 and second base station antennas 322 may be positioned around their respective base station to provide 360-degree coverage. This 360-degree coverage is shown by sectors 314a, 314b, and 314c (collectively, "314") and 324a, 324b, 324c (collectively, "324") associated with each of the first base station antennas 312 and second base station antennas 322, respectively. The sectors 314 and 324 may define the area within which a user device, such as user devices 316a, 316b, 326a, and 326b, may receive coverage of the network. Although first base station antennas 312 and second base station antennas 322 are depicted as singular antenna rods, each of the antennas 312 and 322 may represent panels having a plurality of antenna rods. For example, there may be three panels positioned around each base station 310 and 320 with each panel having multiple antennas. The number of sectors 314 and 324 for base station 310 and 320, respectively, may vary depending on the number of antennas or antenna panels but, the sectors 314 and 324 may generally provide a total of 360-degree coverage around base stations 310 and 320, respectively. Further, each of the first base station antenna 312 and the second base station antennas 322 may include one or more channels for receiving and transmitting communication. Each channel may operate at a particular frequency for transmitting and/or receiving radio signals.

The first base station 310 and the second base station 320 may be operating using a time division duplex (TDD). As previously mentioned, with TDD, a single channel operating a particular frequency may be used for both uplink and downlink communication. In other words, the first base station 310 and the second base station 320 may each transmit and receive signals at the same frequency. To achieve this, the TDD may alternate transmitting and receiving short bursts of data. Accordingly, each of the first base station 310 and the second base station 320 may alternate between "transmitting" periods and "receiving" periods.

In addition to using the same channels and, therefore, the same frequencies for transmitting and receiving signals, the first base station antennas 312 may also be operating with the same frequencies as the second base station antennas 322. Under normal conditions, the first base station 310 and the second base station 320 may use the same frequencies without interference because a signal transmitted from one base station would not be able to travel to a base station in a neighboring market. However, when atmospheric conditions exist in a region between the first base station 310 and the second base station 320 such that tropospheric ducting occurs, such as those illustrated in FIG. 1, a signal from the first base station 310 may travel to the second market 340, and a signal from the second base station 320 may travel to the first market 330. Due to the time delay caused by the signal traveling, a signal transmitted from the first base station 310 during a "transmitting" period may end up in the second market 340 during a "receiving" period. As such, the propagated signal may be received by the second base station 320, thereby causing interference. The same interference can occur from a propagated signal transmitted from the second base station 320 that arrives in the first market 330 at a "receiving" period and is received by the first base station 310.

To avoid this interference, the available frequencies may be allocated between the first base station 310 and the second base station 320. Specifically, adjustments may be made so that at least a portion of the first base station antennas 312 are operating at different frequencies than at least a portion of the second base station antennas 322. By utilizing different frequencies, a signal from the first base station 310 cannot be received by the second base station 320, notwithstanding that the signal has traveled to the second market 340 due to tropospheric ducting.

Figure 4:
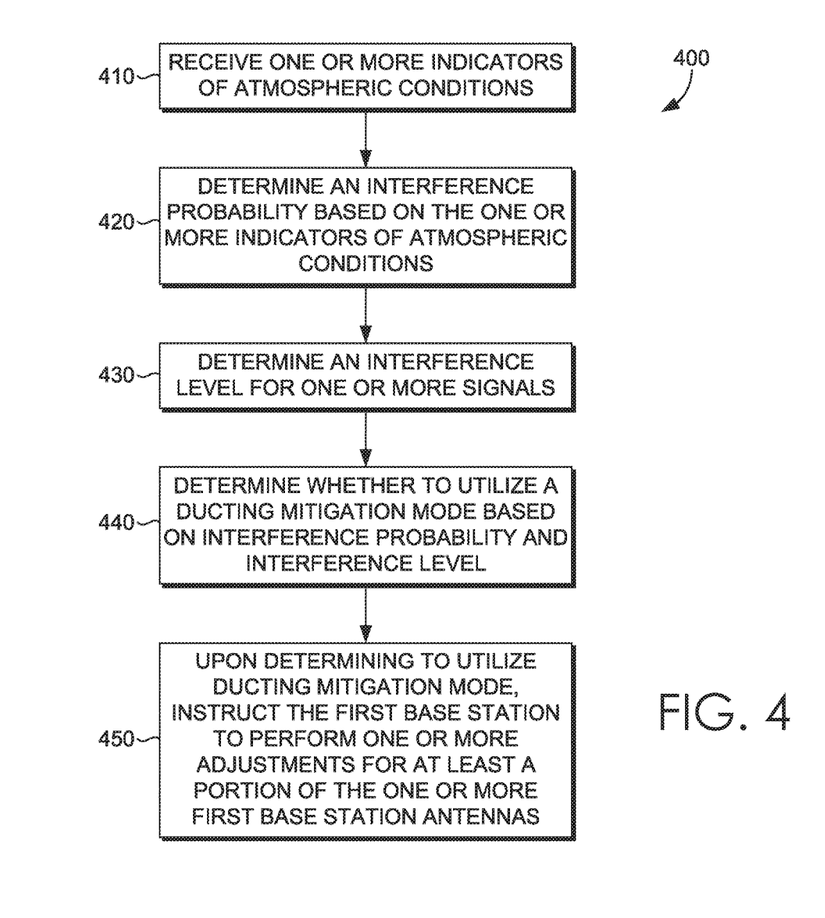
FIG. 4 depicts a flow diagram of a method for identifying and mitigating interference from tropospheric ducting, according to embodiments of the present invention.

Turning to FIG. 4, a flow diagram is shown illustrating a method 400 for dynamically allocating frequencies to mitigate interference caused by tropospheric ducting. At step 410, a first base station, such as first base station 310 in FIG. 3, may receive an indicator of atmospheric conditions for at least a region between the first base station and a second base station, such as second base station 320 in FIG. 3.

Because tropospheric ducting is limited to a particular geographic region experiencing certain atmospheric conditions, receiving information relating to the atmospheric conditions may be used to identify a possible area where interference may be occurring. Such atmospheric conditions may include meteorological conditions such as a layer of dry warm air positioned between layers of cool moist air. Atmospheric conditions may also include a refractive index for a portion of the atmosphere associated with the region. Specifically, the refractive index may be for the portion of the atmosphere that includes the signal path for one or more signals transmitted from the first base station.

It some embodiments, current atmospheric conditions are received. In other embodiments, future atmospheric conditions are received in addition to or instead of current atmospheric conditions. Future atmospheric conditions may be used to anticipate potential ducting. Additionally, indicators of atmospheric conditions may be received continuously, periodically, such as in predetermined time intervals, or on an as-needed basis. The frequency with which indicators are received may vary depending on the season. For example, the frequency may be greater during the summer and autumn months, which tend to correspond to increased likelihood of tropospheric ducting. This step of receiving information may be done by the receiving component 212 of the base station frequency controller 208 in FIG. 2.

By looking to indicators of atmospheric conditions, it is possible to predict tropospheric ducting. Accordingly, at step 420, an interference probability may be determined based on these atmospheric conditions. The interference probability may comprise a likelihood, based on the atmospheric conditions, that tropospheric ducting is present, which may cause interference in a particular region. In some embodiments, the interference probability comprises a likelihood that tropospheric ducting will occur within a future time interval. Determining the interference probability may be done by the determining component 214 of the base station frequency controller 208 in FIG. 2.

Additionally, an actual interference level may be determined at step 430. Once an area or region is found to have a particular interference probability, one or more parameters may be used to determine an interference level, or a level of actual interference occurring. The interference level may relate to one or more signals transmitted from the first base station. The parameters may include uplink noise rise, call failure rate, or call drop rate. These parameters may be measured in a geographical region being served by the first base station, such as first market 330 in FIG. 3, a geographical region being served by the second base station, such as second market 340 in FIG. 3, or in both regions. The information relating to these parameters may also be received by the receiving component 212 of FIG. 2. The interference level may be determined from one or more of the interference parameters.

At step 440, based on the interference level and the interference probability, it may be determined whether to utilize a ducting mitigation mode. Ducting mitigation mode, as used herein, is a particular frequency configuration or state in which one or more first base station antennas use channels having frequencies, which may be referred to as first base station frequencies, that are different than the frequencies used by one or more second base station antennas, which may be referred to as second base station frequencies. In some embodiments, determining whether to utilize a ducting mitigation mode includes comparing the interference probability and/or the interference level to particular thresholds. For example, the interference probability may be compared to an interference probability threshold, such as a refractive index threshold, and the interference level maybe compared to a threshold interference level.

While some aspects may determine whether to use ducting mitigation mode based on either the interference level or the interference probability exceeding their respective thresholds, other aspects consider both the interference level and the interference probability. In some aspects, for instance, there may be an interference probability above a threshold but ducting mitigation mode is not used because the interference level does not exceed a threshold interference level. In this way, the ducting mitigation mode is utilized only when actually needed as there may be times when there is a low level of actual interference, such as an interference level below a predefined threshold, that is considered tolerable. Similarly, it may be determined to utilize the ducting mitigation mode only upon determining that the interference probability exceeds the interference probability threshold. By utilizing a threshold for interference probability, the ducting mitigation mode may be used only when interference is likely caused by tropospheric ducting as there may be other methods for dealing with interference from other sources. Additionally, in some aspects, the method includes determining or establishing one or more baseline or threshold values for interference probability and/or interference level.

At step 450, upon determining to utilize the ducting mitigation mode, instructions may be sent to the first base station to make one or more adjustments to a portion of first base station antennas in accordance with the ducting mitigation mode. For purpose of determining what adjustments are to be made in accordance with ducting mitigation mode, not all of the first base station antennas or all of the second base station antennas may be adjusted because only a portion of the first base station antennas and the second base station antennas may transit or receive signals that are affected by tropospheric ducting. Specifically, only the first base station antennas with sectors generally facing sectors of the second base station antennas may be affected by the tropospheric ducting. Turning back to FIG. 3 as an example, when tropospheric ducting occurs between first base station 310 and second base station 320, adjustments may be made such that only the frequencies used by first base station antenna 312*a* are different than frequencies used by second base station antenna 322*a* because sector 314*a* and sector 324*a* are generally facing each other. Accordingly, in some embodiments, ducting mitigation mode requires the first base station antennas that are generally oriented towards the second base station to operate on different frequencies than the second base station antennas that are generally oriented toward the first base station.

Additionally, in some embodiments, adjustments may be made only to antennas having sectors generally facing a second base station where that second base station is located at a predetermined distance from the first base station, such as distance 350 in FIG. 3. Generally, tropospheric ducting causes interference when a signal travels further than expected and is received by a second base station. When base stations utilize TDD, the second base station is able to receive the propagated signal because it has switched from a transmitting mode to a receiving mode. When the second base station is within a short distance from the first base station, a propagated signal may not be received by the second base station because the second base station may not be in a receiving mode when the signal reaches the second base station. The predetermined distance may be based on the guard period, which is the interval of time between downlink and uplink transmission periods in TDD operations. In some aspects, the guard period may be an interval of time such that a signal transmitted from a first base station would be received by the second base station where the second base station is over 45 miles from the first base station. In this instance, the predetermined distance between the first base station and the second base station may be greater than 45 miles.

In some aspects, the adjustments comprises the first base station turning off or ceasing use of channels for a portion of first base station antennas that are using the same frequencies as a portion of the second base station antennas. In another aspect, the first base station may disable or cease use of a first predetermined set of channels while the second base station may disable or cease use of a second predetermined set of channels. For example, prior to entering ducting mitigation mode, first base station antennas and second base station antennas may both be operating channels having frequencies of 700 megahertz, 800 megahertz, 1700 megahertz, and 1900 megahertz. Using ducting mitigation mode, the first base station antennas may use only channels with frequencies of 700 megahertz and 1700 megahertz while second base station antennas may use channels with frequencies 800 megahertz and 1900 megahertz.

In alternative aspects, the adjustments comprise changing the frequencies used by the first base station. For example, if first base station antennas and second base station antennas are operating channels having frequencies of 700 megahertz and 1700 megahertz, the first base station may adjust the frequencies for the first base station antennas to 800 megahertz and 1900 megahertz while the frequencies for the second base station antennas remain the same. In some embodiments, both the frequencies used for both the first base station antennas and the second base station antennas may be changed.

Figure 5:
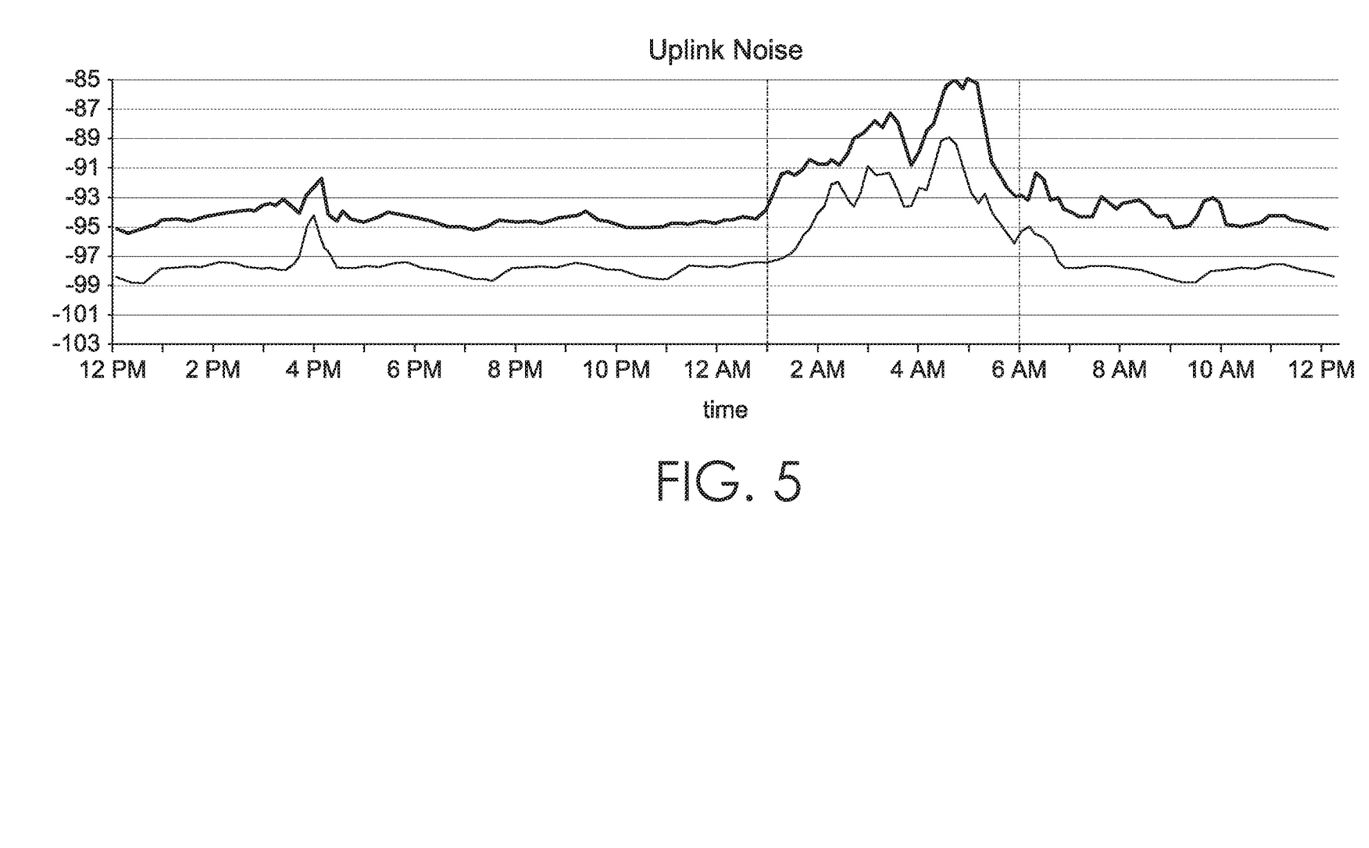
FIG. 5 depicts a graphical illustration of interference caused by tropospheric ducting, according to embodiments of the present invention.

Aspects in which certain channels are no longer used or disabled may decrease the capacity for the corresponding base stations. But, because tropospheric ducting typically coincides with an off-peak period, or a time period associated with low usage of the cellular network, the decreased capacity may not have a negative effect on the service. For example, the conditions that tend to lead to tropospheric ducting generally occur overnight—specifically, between 1 A.M. and 6 A.M.—as shown by FIG. 5. FIG. 5 provides a graphical illustration of uplink noise rise over the span of a day for two markets. Between approximately 1 A.M. and 6 A.M., both markets experience an increased level of uplink noise due to tropospheric ducting. Because there typically is a low level of network usage during those times, channels may be turned off for the first base station and/or the second base station without users experiencing problems. Accordingly, some aspects of method 400 may include determining an off-peak period and only determining to enter ducting mitigation mode or only performing adjustments in accordance with the ducting mitigation mode during the off-peak period.

The instruction to perform adjustments in accordance with ducting mitigation mode may be received from a base station frequency controller, such as base station frequency controller 208 of FIG. 2, that is a component of the first base station. In other aspects, the instruction may come from a controller associated with another base station or a remote controller associated with a plurality of base stations. In some aspects, the instruction is sent via peer-to-peer connections, such as X2 links between eNodeBs. Further, in some aspects, the communication between eNodeBs through X2 links may also be used in determining the frequencies that can be used by certain base stations when in ducting mitigation mode. Upon receiving the instruction, the first base station may perform the one or more adjustments. Additionally, such instructions may also be sent to other base stations, such as second base station or other base stations having antennas transmitting or receiving signals affected by tropospheric ducting, in which case these other base stations may also perform the instructed adjustments.

Though not shown in FIG. 4, some aspects of the method may further include instructing the first base station to perform one or more readjustments to effectively end the ducting mitigation mode. Specifically, one or more readjustments may be made such that the operating frequencies are reverted back to their original configuration. These readjustments may occur when the interference level and/or interference probability indicate that a ducting mitigation mode is no longer needed. In this way, the interference level and/or interference probability may be continuously or periodically monitored when in ducting mitigation mode. In other embodiments, the readjustments may occur due to the end of the off-peak period. For example, as communication traffic increases, it may be more desirable to increase the number of channels being used notwithstanding tropospheric ducting. In this case, the one or more readjustments may be made as communication traffic increases to a particular level or at a predetermined time. The predetermined time may correspond to the end of the off-peak period, such as 6 A.M.

The one or more readjustments performed may depend on what types of adjustments were made in accordance with the ducting mitigation mode. For instance, if one or more channels for the first base station antennas were previously disabled, the one or more readjustments may comprise enabling the one or more channels that were disabled. In another instance, the readjustments comprise changing the frequencies of one or more channels of the first base station antennas and the second base station antennas to previously used frequencies.

It will be understood by those of ordinary skill in the art that the order of steps shown in the method 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

Figure 6:
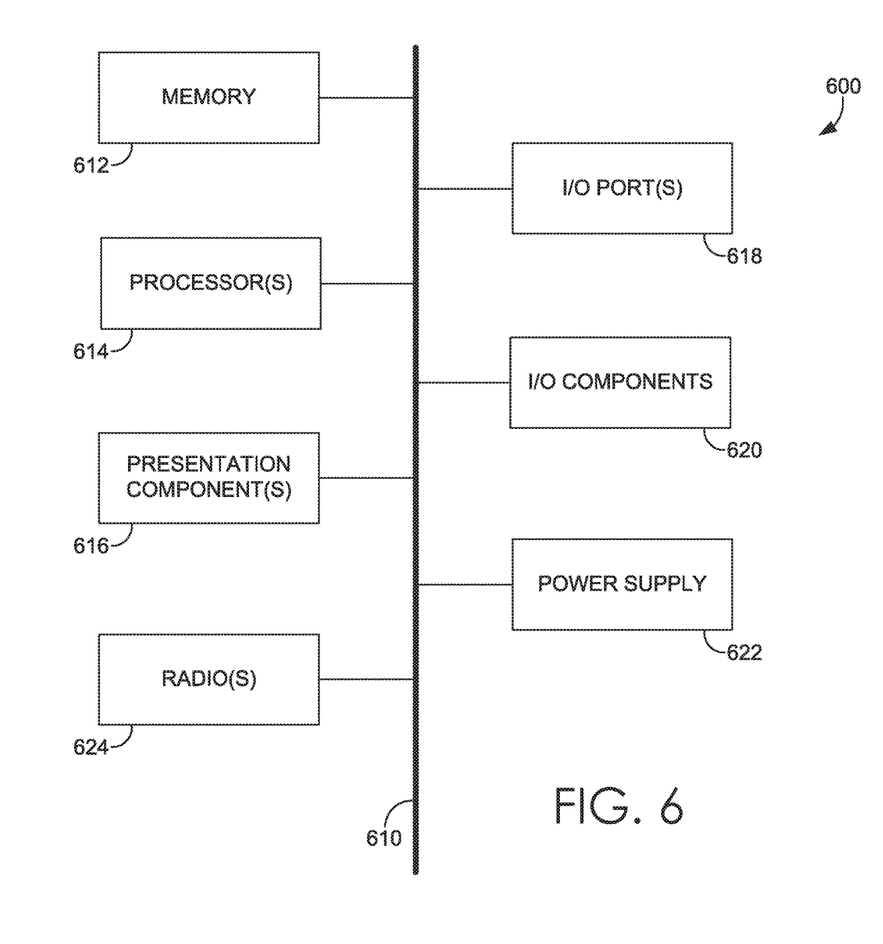
FIG. 6 depicts an exemplary computing device, according to embodiments of the present invention.

Referring to FIG. 6, an exemplary architecture for implementing aspects of the described technology as described above is shown. The exemplary architecture is designated generally as communications device 600. Communications device 600 is but one example of a suitable computing operating environment and is not intended to suggest any limitation as to the scope of use or functionality of the technology described. Neither should the computing device be interpreted as having any dependency or requirement relating to any one or a combination of components illustrated.

Although some components are shown in the singular, they may be plural. For example, communications device 600 might include multiple processors or multiple radios, etc. As illustratively shown, communications device 600 includes a bus 610 that directly or indirectly couples various components together including memory 612, a processor 614, a presentation component 616, a radio 624 (if applicable), input/output ports 618, input/output components 620, and a power supply 622.

Memory 612 might take the form of memory components previously described. Thus, further elaboration will not be provided here, only to say that memory component 612 can include any type of medium that is capable of storing information (e.g., a database). A database can be any collection of records. In one embodiment, memory 612 includes a set of embodied computer-executable instructions 513 that, when executed, facilitate various aspects disclosed herein. These embodied instructions will variously be referred to as "instructions" or an "application" for short.

Processor 614 might actually be multiple processors that receive instructions and process them accordingly. Presentation component 616 includes the likes of a display, a speaker, as well as other components that can present information (such as a lamp (LED), or even lighted keyboards).

Numeral 624 represents a radio(s) that facilitates communication with a wireless-telecommunications network. Illustrative wireless telecommunications technologies include CDMA, GPRS, TDMA, GSM, and the like. Radio 624 might additionally or alternatively facilitate other types of wireless communications including Wi-Fi, WiMAX, LTE, or other VoIP communications. As can be appreciated, in various embodiments, radio 624 can be configured to support multiple technologies and/or multiple radios can be utilized to support multiple technologies.

Input/output port 618 might take on a variety of forms. Illustrative input/output ports include a USB jack, stereo jack, infrared port, proprietary communications ports, and the like. Input/output components 620 include items such as keyboards, microphones, speakers, touch screens, and any other item usable to directly or indirectly input data into communications device 600. Power supply 622 includes items such as batteries, fuel cells, or any other component that can act as a power source to power communications device 600.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for mitigating interference caused by tropospheric ducting, the method comprising:
   at a server having one or more processors, receiving one or more values of atmospheric conditions in at least a region located between a first base station and a second base station, wherein the first base station has one or more first base station antennas and the second base station has one or more second base station antennas;
   determining an interference probability based on the one or more values of atmospheric conditions;
   determining an interference level for one or more signals transmitted from the first base station;
   based on at least the interference probability and the interference level, determining whether to utilize a ducting mitigation mode, wherein the ducting mitigation mode comprises a state where at least a portion of the one or more first base station antennas are operating at one or more first base station frequencies and at least a portion of the one or more second base station antennas are operating at one or more second base station frequencies, wherein the one or more first base station frequencies and the one or more second base station frequencies are different; and
   upon determining to utilize the ducting mitigation mode, instructing the first base station to perform one or more adjustments for the portion of the one or more first base station antennas in accordance with the ducting mitigation mode.

2. The media of claim 1, wherein the first base station is located at a predetermined distance from the second base station that is based on a guard period, wherein the guard period is an interval of time between downlink and uplink transmission periods.

3. The media of claim 1, wherein the portion of the one or more first base station antennas are generally orientated towards the portion of the one or more second base station antennas.

4. The media of claim 1, wherein the interference probability comprises a likelihood of tropospheric ducting in the region located between the first base station and the second base station.

5. The media of claim 1, wherein the one or more values of atmospheric conditions includes a refractive index value of a signal path of the one or more signals transmitted from the first base station.

6. The media of claim 5, wherein determining the interference probability includes comparing the refractive index value to one or more refractive index thresholds.

7. The media of claim 1, wherein the interference level is based on one or more of uplink noise rise, call failure rate, or call drop rate.

8. The media of claim 1, wherein the method further comprises receiving a threshold interference level and wherein determining whether to utilize the ducting mitigation mode includes comparing the interference level to the threshold interference level.

9. The media of claim 1, wherein the one or more adjustments for the portion of the one or more first base station antennas includes disabling one or more channels used by the portion of the one or more first base station antennas that are operating at a frequency that is the same as one of the second base station frequencies.

10. The media of claim 1, wherein the one or more adjustments for the portion of the one or more first base station antennas includes adjusting the one or more first base station frequencies to be different than the one or more second base station frequencies.

11. The media of claim 1, wherein the method further comprises instructing the first base station to perform one or more readjustments to the portion of the one or more first base station antennas, wherein the one or more readjustments undo the one or more adjustments performed according to the ducting mitigation mode.

12. The media of claim 1, wherein the server is a component of the first base station.

13. The media of claim 1, wherein the server is a component of a base station other than the first base station and wherein instructing the first base station to perform one or more adjustments includes sending instructions to the first base station over X2 links.

14. One or more non-transitory computer-readable storage media having computer-executable instructions embodied thereon that, when executed, perform a method for mitigating interference caused by tropospheric ducting, the method comprising:
- at a first base station having one or more first base station antennas, receiving one or more values of atmospheric conditions for at least a region located between the first base station and a second base station, wherein the second base station has one or more second base station antennas and is located at a predetermined distance from the first base station;
- determining an interference probability based on the one or more values of atmospheric conditions;
- determining an interference level for one or more signals transmitted from the first base station;
- based on at least the interference probability and the interference level, determining whether to utilize a ducting mitigation mode, wherein the ducting mitigation mode comprises a state where at least a portion of the one or more first base station antennas are operating at one or more first base station frequencies and at least a portion of the one or more second base station antennas are operating at one or more second base station frequencies, wherein the one or more first base station frequencies and the one or more second base station frequencies are different; and
- upon determining to utilize the ducting mitigation mode, disabling one or more channels used by the portion of the one or more first base station antennas that are operating at a frequency that is the same as one of the second base station frequencies.

15. The media of claim 14, wherein the one or more values of atmospheric conditions includes a refractive index value of a signal path of the one or more signals transmitted from the first base station.

16. The media of claim 14, wherein the method further comprises, at a predetermined time, enabling the one or more channels that were disabled.

17. The media of claim 16, wherein the predetermined time corresponds to an end of an off-peak period, wherein the off-peak period comprises a time period associated with low usage of a cellular network that includes the first base station.

18. A system for mitigating interference caused by tropospheric ducting, the system comprising:
- a first base station with one or more first base station antennas;
- a second base station with one or more second base station antennas, wherein the second base station is located at a pre-determined distance from the first base station; and
- a server having one or more processors and one or more non-transitory computer storage media configured to:
- receive one or more values of atmospheric conditions for at least a region located between the first base station and the second base station;
- determine an interference probability based on the one or more values of atmospheric conditions;
- determine an interference level for one or more signals transmitted from the first base station;
- based on the interference probability and the interference level, determine whether to utilize a ducting mitigation mode, wherein the ducting mitigation mode comprises a state where at least a portion of the one or more first base station antennas are operating at one or more first base station frequencies and at least a portion of the one or more second base station antennas are operating at one or more second base station frequencies, wherein the one or more first base station frequencies and the one or more second base station frequencies are different;
- upon determining to utilize the ducting mitigation mode, instruct the first base station to perform one or more adjustments for the portion of the one or more first base station antennas in accordance with the ducting mitigation mode; and
- instruct the first base station to perform one or more readjustments to the portion of the one or more first base station antennas, wherein the one or more readjustments undo the one or more adjustments performed according to the ducting mitigation mode.

19. The system of claim 18, wherein the one or more adjustments for the portion of the one or more first base station antennas includes disabling one or more channels used by the portion of the one or more first base station antennas that are operating at a frequency that is the same as one of the second base station frequencies.

20. The system of claim 18, wherein the one or more readjustments occurs at an end of an off-peak period, wherein the off-peak period is a time period associated with low usage of a cellular network that includes the first base station.

* * * * *